(12) United States Patent
Islam

(10) Patent No.: US 6,631,028 B1
(45) Date of Patent: Oct. 7, 2003

(54) BROADBAND AMPLIFIER AND COMMUNICATION SYSTEM

(75) Inventor: Mohammed N. Islam, Allen, TX (US)

(73) Assignee: Xtera Communications, Inc., Allen, TX (US)

(*) Notice: Subject to any disclaimer, the term of this patent is extended or adjusted under 35 U.S.C. 154(b) by 0 days.

(21) Appl. No.: 09/547,169

(22) Filed: Apr. 11, 2000

Related U.S. Application Data

(63) Continuation-in-part of application No. 09/470,831, filed on Dec. 23, 1999, now abandoned, and a continuation-in-part of application No. 09/471,752, filed on Dec. 23, 1999, now abandoned, which is a continuation-in-part of application No. 09/046,900, filed on Mar. 24, 1998, now Pat. No. 6,101,024.

(51) Int. Cl.[7] .................. H04B 10/17; G02B 6/02; H01S 3/30
(52) U.S. Cl. .................. 359/349; 359/337.1; 359/337.4; 372/3; 372/33
(58) Field of Search .............................. 359/334, 337.1, 359/337.4; 372/3, 33

(56) References Cited

U.S. PATENT DOCUMENTS

| | | | |
|---|---|---|---|
| 4,923,291 A | 5/1990 | Edagawa et al. | 350/389 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,224,194 A | 6/1993 | Islam | 385/122 |
| 5,251,642 A | 10/1993 | Handlos | 128/774 |
| 5,369,519 A | 11/1994 | Islam | 359/173 |
| 5,485,536 A | 1/1996 | Islam | 385/31 |
| 5,523,874 A * | 6/1996 | Epworth | 359/161 |

(List continued on next page.)

FOREIGN PATENT DOCUMENTS

| | | | |
|---|---|---|---|
| EP | 0 841 764 A2 | 5/1998 | H04B/10/24 |
| EP | 0 903 877 A2 | 3/1999 | H04B/10/18 |
| EP | 1 069 712 A2 | 1/2001 | H04B/10/17 |
| FR | 2 764 452 A1 | 12/1998 | H04J/14/02 |
| WO | 96/16612 A1 | 6/1996 | A61F/2/08 |
| WO | 99/49580 A2 | 9/1999 | |
| WO | 99/62407 A1 | 12/1999 | A61B/17/04 |
| WO | 99/66607 A2 | 12/1999 | |

OTHER PUBLICATIONS

Stolen et al., "Parametric Amplification and Frequency Conversion in Optical Fibers," IEEE Journal of Quantum Electronics, vol. QE–18, No. 7, pp. 1062–1072, Jul. 1982.
Agrawal, "Stimulated Raman Scattering," Ch. 8 and "Parametric Processes," Ch. 10 of Nonlinear Fiber Optics, 1989.
Hansen et al., "Repeaterless transmission experiment employing dispersion," 21st European Conference on Optical Communication, vol. 2, 1 page, Sep. 17–21, 1995.
Zou et al., "Compensation of Raman Scattering and EDFA's Nonuniform Gain in Ultra–Long–Distance WDM Links," IEEE Photonics Technology Letters, vol. 8, No. 1, pp. 139–141, Jan. 1996.

(List continued on next page.)

*Primary Examiner*—Nelson Moskowitz
(74) *Attorney, Agent, or Firm*—Baker Botts L.L.P.

(57) ABSTRACT

An in-line broadband amplifier includes at least one input fiber and a WDM splitter coupled to the input fiber. The splitter splits an optical signal into at least a first wavelength and a second wavelength. A transition from a stop band to a pass band of the splitter occurs in 20 nm or less. A Raman amplifier and a rare-earth doped optical amplifier are coupled to the splitter. A WDM combiner is coupled to the Raman amplifier and the rare-earth doped optical amplifier. The WDM combiner combines an optical signal into at least a first wavelength and a second wavelength. A transition from a stop band to a pass band of the combiner occurs in 20 nm or less. An output fiber is coupled to the WDM combiner.

26 Claims, 14 Drawing Sheets

U.S. PATENT DOCUMENTS

| | | | | |
|---|---|---|---|---|
| 5,664,036 | A | | 9/1997 | Islam .......................... 385/31 |
| 5,673,342 | A | * | 9/1997 | Nelson et al. ................. 385/24 |
| 5,689,596 | A | | 11/1997 | Evans .......................... 385/27 |
| 5,778,014 | A | | 7/1998 | Islam ........................... 372/6 |
| 5,790,300 | A | | 8/1998 | Zediker et al. ............. 359/334 |
| 5,796,909 | A | | 8/1998 | Islam ......................... 385/147 |
| 5,815,518 | A | | 9/1998 | Reed et al. ..................... 372/6 |
| 5,905,838 | A | | 5/1999 | Judy et al. .................. 385/123 |
| 5,966,480 | A | * | 10/1999 | LeGrange et al. ............. 385/27 |
| 5,978,130 | A | | 11/1999 | Fee et al. .................... 359/341 |
| 6,043,927 | A | | 3/2000 | Islam .......................... 359/332 |
| 6,052,393 | A | | 4/2000 | Islam ............................ 372/6 |
| 6,088,152 | A | | 7/2000 | Berger et al. ............... 359/334 |
| 6,101,024 | A | | 8/2000 | Islam et al. .................. 359/334 |
| 6,151,160 | A | | 11/2000 | Ma et al. ..................... 359/341 |
| 6,191,877 | B1 | | 2/2001 | Chraplyvy et al. ......... 359/124 |
| 6,239,902 | B1 | | 5/2001 | Islam et al. .................. 359/334 |
| 6,239,903 | B1 | | 5/2001 | Islam et al. .................. 359/337 |
| 6,335,820 | B1 | | 1/2002 | Islam .......................... 359/334 |
| 6,356,384 | B1 | | 3/2002 | Islam .......................... 359/334 |
| 6,359,725 | B1 | | 3/2002 | Islam .......................... 359/334 |
| 6,370,164 | B1 | | 4/2002 | Islam ............................ 372/6 |
| 6,374,006 | B1 | | 4/2002 | Islam et al. ................... 385/15 |
| 6,381,391 | B1 | | 4/2002 | Islam et al. ................. 385/123 |

OTHER PUBLICATIONS

Yamada et al., "Broadband and gain–flattened amplifier composed of 1.55µm–band $Er^{3+}$ doped fibre amplifier in a parallel configuration," Electronics Letters, vol. 33, No. 8, pp. 710–711, Apr. 10, 1997.

Masuda et al., "Ultra–wideband optical amplification with 3dB bandwidth of 65 nm using a gain–equalized two–stae erbium–doped fibre amplifier and Raman amplification," Electronics Letters, vol. 33, No. 9, pp. 73–78, Apr. 1997.

Masuda et al., "75–mm 3–dB Gain–band Optical Amplification with Erbium–doped fluoride fibre amplifiers and Distributed Raman Amplifiers in 9×2.5–Gb/s–WDM Transmission Experiment," ECOC Conference, vol. 5, No. 448, pp. 73–76, Sep. 22, 1997.

Wysocki et al., "Broad–Band Erbium–Doped Fiber Amplifier Flattened Beyond 40 nm Using Long–Period Grating Filter," IEEE Photonics Technology Letters, vol. 9, No. 10, pp. 1343–1345, Oct. 1997.

Sun et al., "80nm ultra–wideband erbium–doped silica fibre amplifier," vol. 33, No. 23, pp. 1965–1967, Nov. 6, 1997.

Masada et al., Wideband, gain–flattened, erbium–doped fibre amplifiers with 3dB bandwidths of >50nm, date NlA.

Becker et al., "Erbium Doped Fiber Amplifiers Fundamentals and Technology," Academic Press, pp. 55–60, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Nielsen et al., "3.28 Tb/s (82×40 Gb/s) transmission over 3×100 km nonzero–dispersion fiber using dual C– and L–band hybrid Raman/Erbium–doped inline amplifiers," OFCC 2000, pp. 1229–1231, Mar. 7–10, 2000.

Pending U.S. patent application Ser. No. 09/765,972; entitled "S+ Band Nonlinear Polarization Amplifiers", filed Jan. 19, 2001.

Pending U.S. patent application Ser. No. 09/990,142; entitled "Broadband Amplifier and Communication System", Filed Nov. 20, 2001.

PCT International Search Report Form PCT/ISA/210, Sep. 6, 1999.

PCT International Search Report Form PCT/ISA/210, Jan. 11, 2000.

PCT International Search Report Form PCT/ISA/210, Jan. 22, 2002.

PCT International Search Report Form PCT/ISA/210, Jan. 22, 2002.

Frutal et al, Fukuoka University Review of Tech. Sci., No. 62, pp 125–134, Mar. 1999.*

Furuta et al, ISRAMT '99, 7th Intern. Symp. pp 99–102, Dec. 1999.*

* cited by examiner

BROADBAND AMPLIFIER AND COMMUNICATION SYSTEM

CROSS-REFERENCE TO RELATED APPLICATION

This application is a continuation-in-part of Ser. No. 09/046,900, filed Mar. 24, 1998, now U.S. Pat. No. 6,101,024 and a continuation-in-part of Ser. No. 09/471,752, filed Dec. 23, 1999, and now abandoned which is a continuation-in-part of Ser. No. 09/470,831, filed Dec. 23, 1999 now abandoned and Ser. No. 09/046,900, filed Mar. 24, 1998, now U.S. Pat. No. 6,101,024 all of which are fully incorporated herein by reference.

BACKGROUND

1. Field of the Invention:

The present invention relates generally to broadband amplifiers and communication systems, and more particularly to broadband booster amplifiers and communication systems with Raman and rare-earth doped amplifiers.

2. Description of Related Art

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers optical amplifiers and wavelength-division multiplexing (WDM) have been developed and utilized in optical communications. Optical amplifiers boost the signal strength and compensate for inherent fiber loss and other splitting and insertion losses. WDM enables different wavelengths of light to carry different signals parallel over the same optical fiber. Although WDM is critical in that it allows utilization of a major fraction of the fiber bandwidth, it would not be cost-effective without optical amplifiers. In particular, a broadband optical amplifier that permits simultaneous amplification of many WDM channels is a key enabler for utilizing the full fiber bandwidth.

Silica-based optical fiber has its lowest loss window around 1550 nm with approximately 25 THz of bandwidth between 1430 and 1620 mn. In this wavelength region, erbium-doped fiber amplifiers (EDFAs) are widely used. However, the absorption band of a EDFA nearly overlaps its the emission band. For wavelengths shorter than about 1525 nm, erbium-atoms in typical glasses will absorb more than amplify. To broaden the gain spectra of EDFAs, various dopings have been added. Co-doping of the silica core with aluminum or phosphorus broadens the emission spectrum considerably. Nevertheless, the absorption peak for the various glasses is still around 1530 nm.

Broadening the bandwidth of EDFAs to accommodate a larger number of WDM channels has become a subject of intense research. A two-band architecture for an ultra-wideband EDFA has been developed with an optical bandwidth of 80 nm. To obtain a low noise figure and high output power, the two bands share a common first gain section and have distinct second gain sections. The 80 nm bandwidth comes from one amplifier (so-called conventional band or C-band) from 1525.6 to 1562.5 nm and another amplifier (so-called long band or L-band) from 1569.4 to 1612.8 nm.

These recent developments illustrate several points in the search for broader bandwidth amplifiers for the low-loss window in optical fibers. First, even with EDFAs, bandwidth in excess of 40–50 nm requires the use of parallel combination of amplifiers. Second, the 80 nm bandwidth may be very close to the theoretical maximum. The short wavelength side at about 1525 nm is limited by the inherent absorption in erbium, and long wavelength side is limited by bend-induced losses in standard fibers at above 1620nm. Therefore, even with these recent advances, half of the bandwidth of the low-loss window, i.e., 1430–1530 nm, remains without an optical amplifier.

There is a need for a broadband amplifier and broadband communication system suitable for a wide range of wavelengths.

SUMMARY OF THE INVENTION

Accordingly an object of the present invention is to provide broadband amplifiers and communication systems.

Another object of the present invention is to provide broadband amplifiers and communication systems that are suitable for use.

Another object of the present invention is to provide broadband amplifiers and communication systems that include Raman and rare-earth doped amplifiers.

Yet another object of the present invention is to provide broadband amplifiers and communication systems that are suitable for use for WDM wavelengths of 1430 to 1530 nm.

A further object of the present invention is to provide broadband amplifiers and communication systems that are suitable for use for WDM wavelengths of 1430 to 1530 nm in combination with wavelengths of 1530 to 1620 nm.

Another object of the present invention to provide a parallel optical amplification apparatus and communication system that includes Raman and rare-earth doped optical amplifiers.

Still another object of the present invention to provide a parallel optical amplification apparatus and communication system that includes Raman and rare-earth doped optical amplifiers and a splitter with a transition from a stop band to a pass band in 20 nm or less.

Yet another object of the present invention to provide a parallel optical amplification apparatus and communication system that includes Raman and rare-earth doped optical amplifiers and a combiner with a transition from a stop band to a pass band in 20 nm or less.

These and other objects of the present invention are achieved in an in-line broadband amplifier. The amplifier includes at least one input fiber and a WDM splitter coupled to the input fiber. The splitter splits an optical signal into at least a first wavelength and a second wavelength. A transition from a stop band to a pass band of the splitter occurs in 20 nm or less. A Raman amplifier and a rare-earth doped optical amplifier are coupled to the splitter. A WDM combiner is coupled to the Raman amplifier and the rare-earth doped optical amplifier. The WDM combiner combines an optical signal into at least a first wavelength and a second wavelength. A transition from a stop band to a pass band of the combiner occurs in 20 nm or less. An output fiber is coupled to the WDM combiner.

In another embodiment of the present invention, a broadband booster amplifier includes a plurality of transmitters that emit a plurality of wavelengths. At least a first band of wavelengths and a second band of wavelengths are produced. A Raman amplifier is coupled to at least a portion of the plurality of transmitters and amplifies the first band of wavelengths. A rare-earth doped optical amplifier is coupled to at least a portion of the plurality of transmitters and amplifies the second band of wavelengths. A WDM combiner is coupled to the Raman amplifier and the rare-earth doped optical amplifier. The WDM combiner combines an optical signal into at least a first wavelength and a second wavelength. A transition from a stop band to a pass band of the combiner occurs in 20 nm or less. An output fiber is coupled to the WDM combiner.

In another embodiment of the present invention, a broadband communication system includes a transmitter and at least one input fiber coupled to the transmitter. A WDM splitter is coupled to the input fiber. The splitter splits an optical signal into at least a first wavelength and a second wavelength. A Raman amplifier and a rare-earth doped optical amplifier are coupled to the splitter. A WDM combiner is coupled to the Raman amplifier and the rare-earth doped optical amplifier. The WDM combiner combines an optical signal into at least a first wavelength and a second wavelength. An output fiber is coupled to the WDM combiner. At least one in-line broadband amplifier is coupled to the output fiber. A receiver is coupled to the in-line amplifier.

In another embodiment of the present invention, a broadband communication system, includes a transmitter and at least one input fiber coupled to the transmitter. A WDM splitter is coupled to the input fiber. The splitter splits an optical signal into at least a first beam and a second beam. A transition from a stop band to a pass band of the coupler occurs in 15 nm or less. A Raman amplifier coupled to the splitter and a rare-earth doped optical amplifier are coupled to the splitter. A WDM combiner is coupled to the Raman amplifier and the rare-earth doped optical amplifier. An output fiber is coupled to the WDM combiner and a broadband pre-amplifier is coupled to the output fiber.

In another embodiment of the present invention, a broadband communication system, includes a transmitter and a booster broadband amplifier coupled to the transmitter. At least one input fiber is coupled to booster amplifier. A WDM splitter is coupled to the input fiber. A Raman amplifier and a rare-earth doped optical amplifier are coupled to the splitter. A WDM combiner is coupled to the Raman amplifier and the rare-earth doped optical amplifier. An output fiber is coupled to the WDM combiner and a broadband pre-amplifier is coupled to the output fiber. A receiver is coupled to the broadband pre-amplifier.

DETAILED DESCRIPTION OF PREFERRED EMBODIMENTS

In various embodiments, the present invention provides parallel optical amplification with a combination of optical amplifiers. This parallel optical amplification can include two parallel stages of Raman and rare-earth doped optical amplifiers.

Figure 1A:
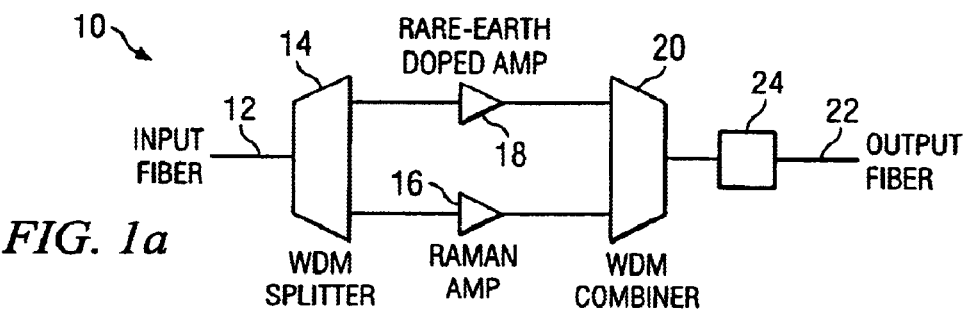
FIG. 1(a) is a schematic diagram of one embodiment of a broadband amplifier of the present invention with a parallel geometric combination of Raman and rare-earth doped amplifiers.
Figure 1B:
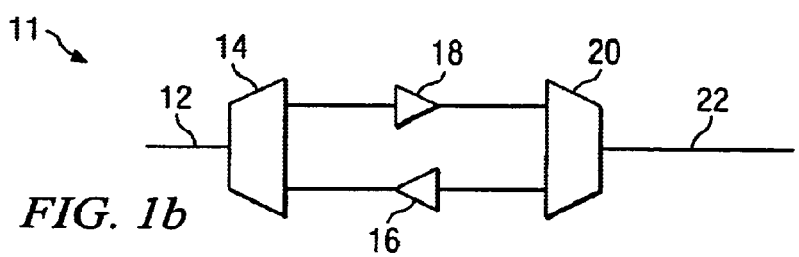
FIG. 1(b) is a schematic diagram of another embodiment of a broadband amplifier of the present invention with a parallel geometric combination of Raman and rare-earth doped amplifiers.

Referring now to FIGS. 1(a) and 1(b), Amplifier 10 (FIG. 1(a)) and amplifier 11 (FIG. 1(b)) each include at least one input fiber 12 coupled to a splitter 14. Examples of splitters include WDM couplers, fused tapered couplers, Mach-Zehnder interferometers, gratings and circulators, and the like. Splitter 14 divides an optical signal having a wavelength between 1430 nm and 1620 nm at a predetermined wavelength, preferably at 1525 nm, into at least a first wavelength and a second wavelength. A Raman amplifier 16 and a rare-earth doped optical amplifier 18 are coupled to splitter 14 and arranged in a parallel manner. Raman amplifier 16 receives the first band and produces an amplified broadband first band. Rare-earth doped optical amplifier 18 receives the second band and produces an amplified broadband second band.

A combiner 20 is coupled to Raman amplifier 16 and rare-earth doped optical amplifier 18 Combiner 20 combines the amplified and spectrally broadened first and second bands to produce an amplified broadband optical signal. A transition from a stop band to a pass band of combiner 20 occurs in preferably 20 nm or less, more preferably 15 nm or less and most preferably 10 nm or less. An output fiber 22 is coupled to combiner 20. Preferably splitter 14 and combiner 20 are WDM couplers. An output fiber 22 is coupled to combiner 20.

In one embodiment, input fiber 12 transmits at least a first wavelength and a second wavelength. The first wavelength falls within a gain bandwidth of Raman amplifier 16 and the second wavelength falls within a gain bandwidth of rare-earth doped optical amplifier 18.

A gain tilt control device 24 can be coupled to splitter 14. Raman amplifier 16, rare-earth doped optical amplifier 18 or combiner 20. Suitable gain tilt control devices 24 include but are not limited to adjustable gain flattening filters, long period gratings, cascaded Mach-Zehnder filters, acousto-optic filter devices and the like.

In FIG. 1(a) Raman amplifier 16 and rare-earth doped amplifier 18 are arranged so that the first and second bands co-propagate In FIG. 1(b), Raman amplifier 16 and rare-earth doped amplifier 18 are arranged so that the first and second bands are counter-propagating. The counter-propagating reduces interaction between the first and second bands.

Figure 2A:
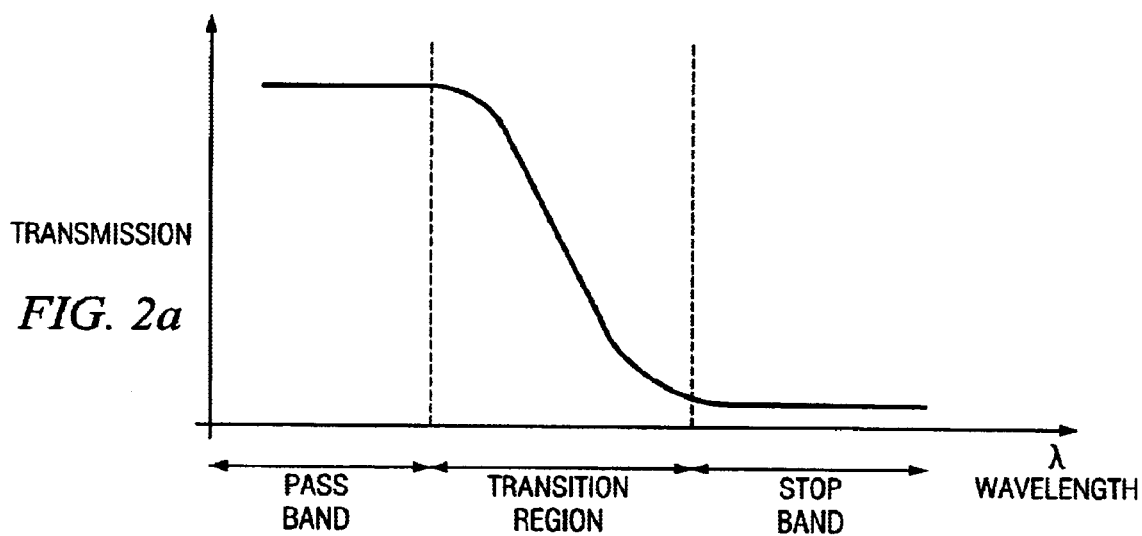
FIG. 2(a) is a graph illustrating that transmission of any two bands from the parallel geometric combinations of the Raman and rare-earth amplifiers of FIGS. 1(a) and 1(b) is a function of wavelength of combiners splitters.
Figure 2B:
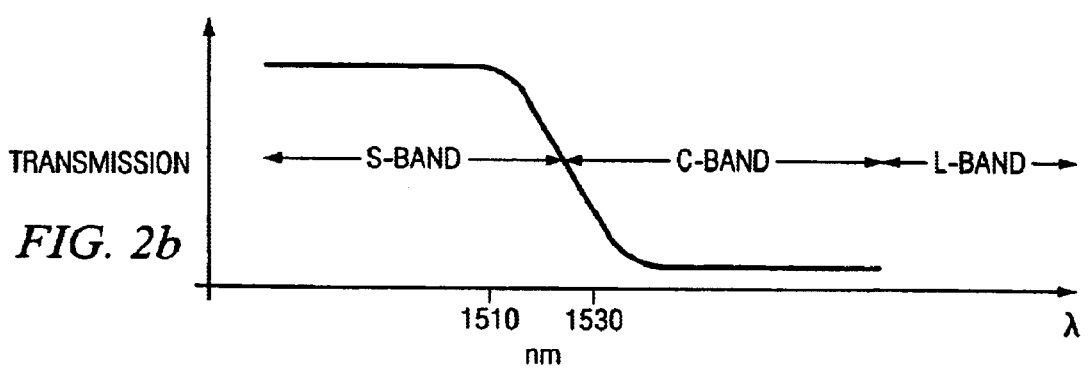
FIG. 2(b) is a graph illustrating that transmission of the C or L band and the S band from the parallel geometric combinations of the Raman and rare-earth amplifiers of FIGS. 1(a) and 1(b) is a function of wavelength of combiners splitters.

FIGS. 2(a) and 2(b) illustrate that in parallel geometric combinations of Raman amplifier 16 and rare-earth doped amplifier 18 transmission of the two bands is a function of wavelength of combiner 20 and splitter 14. FIG. 2(a) is generic for any two bands while FIG. 2(b) is specific to the S and C/L bands.

Figure 3A:
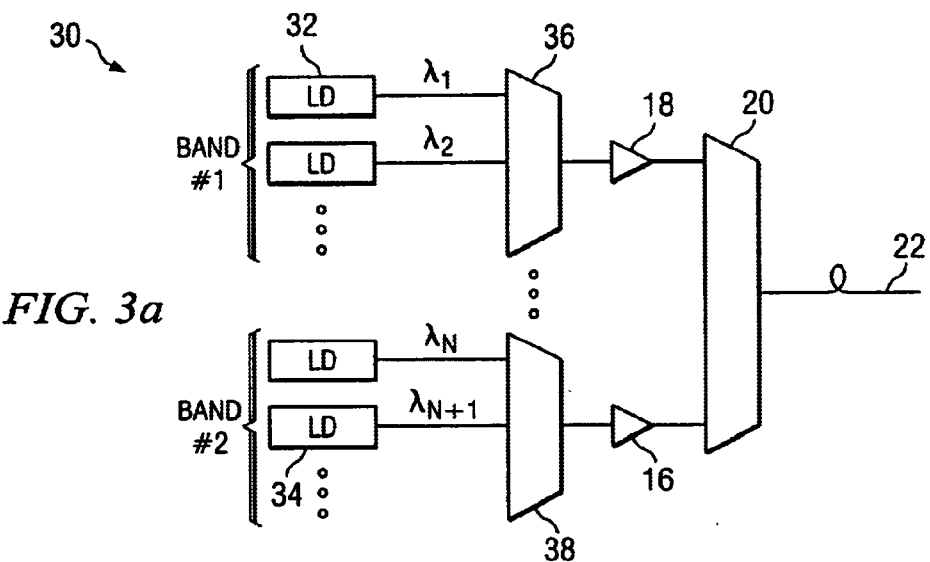
FIG. 3(a) is a schematic diagram of one embodiment of a broadband booster amplifier of the present invention.
Figure 3B:
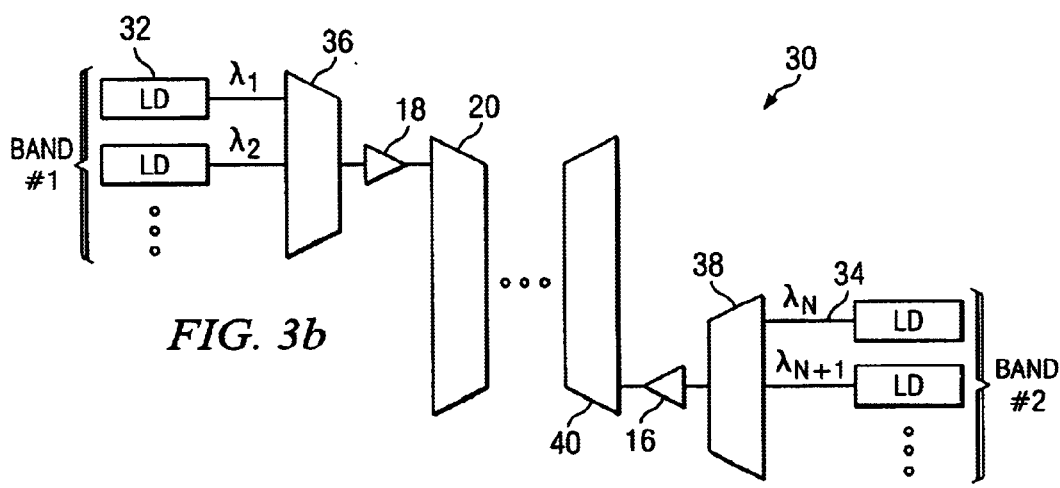
FIG. 3(b) is a schematic diagram of another embodiment of a broadband booster amplifier of the present invention.

FIGS. 3(a) and 3(b) illustrate broadband booster amplifier 30 embodiments of the present invention that include a first plurality of transmitters 32 that emits a first plurality of wavelengths, and a second plurality of transmitters 34 that transmit a second band of wavelengths. Raman amplifier 16 is coupled to the second plurality of transmitters 34 through a combiner 38. Raman amplifier 16 amplifies the first band of wavelengths. Rare-earth doped optical amplifier 18 is coupled to the plurality of transmitters 32 through a combiner 36. Rare-earth doped optical amplifier 18 amplifies the second band of wavelengths. Combiner 20 is coupled to Raman amplifier 16 and rare-earth doped optical amplifier 18. Combiner 20 combines an optical signal from Raman amplifier 16 and rare-earth doped amplifier 18 into at least a first wavelength and a second wavelength. A transition from a stop band to a pass band of combiner 20 occurs preferably in 20 nm or less, more preferably 15 nm or less and still more preferably 10 nm or less. Output fiber 22 is coupled to combiner 20. Gain tilt control device 24 can be coupled to Raman amplifier 16, rare-earth doped optical amplifier 18 or combiner 20. In FIG. 3(b), rare-earth doped amplifier 18 is coupled to combiner 20. Raman amplifier 16 is coupled to a combiner 40.

In FIG. 3(a) Raman amplifier 16 and rare-earth doped amplifier 18 are arranged so that the first and second bands co-propagate In FIG. 3(b), Raman amplifier 16 and rare-earth doped amplifier 18 are arranged so that the first and second bands are counter-propagating.

Figure 4A:
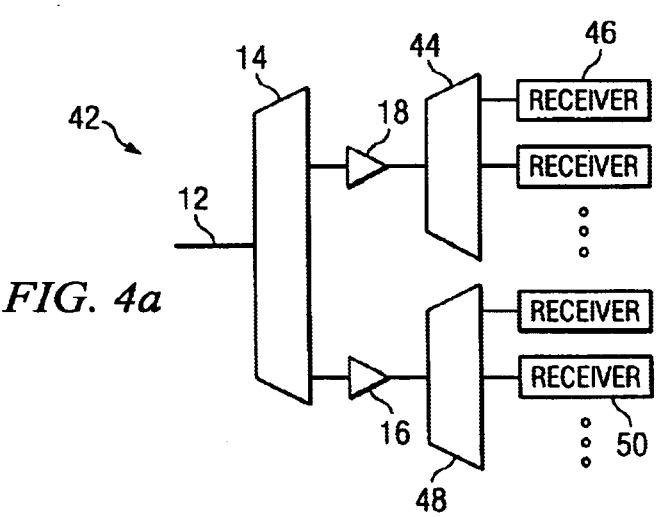
FIG. 4(a) is a schematic diagram of one embodiment of a broadband pre-amplifier of the present invention.
Figure 4B:
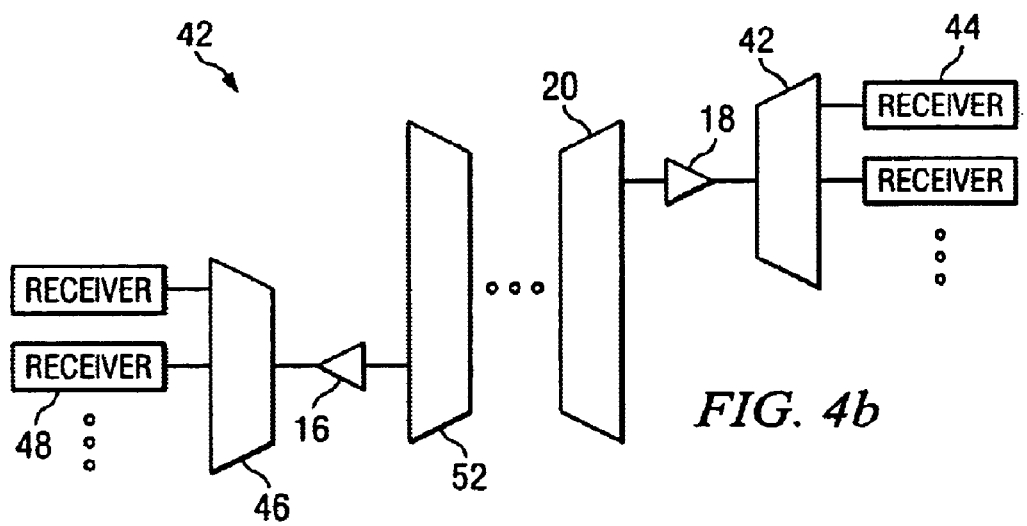
FIG. 4(b) is a schematic diagram of another embodiment of a broadband pre-amplifier of the present invention.

FIGS. 4(a) and 4(b) illustrate broadband pre-amplifier 42 embodiments of the present invention that include at least one input fiber 12 coupled to splitter 14. Splitter 14 splits an optical signal into at least a first wavelength and a second wavelength, wherein a transition from a stop band to a pass band of the splitter occurs preferably in 20 nm or less, more preferably 15 nm or less and still more preferably in 10 nm or less. Raman amplifier 16 and rare-earth doped optical amplifier are coupled to splitter 14. A splitter 44 is coupled to a first plurality of receivers 46 and rare-earth doped optical amplifier 18. A splitter 48 is coupled to a second plurality of receivers 50 and Raman amplifier 18. In FIG. 4(b), rare-earth doped amplifier 18 is coupled to combiner 20. Raman amplifier 16 is coupled to combiner 52.

In FIG. 4(a) Raman amplifier 16 and rare-earth doped amplifier 18 are arranged so that the first and second bands co-propagate In FIG. 4(b), Raman amplifier 16 and rare-earth doped amplifier 18 are arranged so that the first and second bands are counter-propagating.

In the embodiments illustrated in FIGS. 1(a) through 4(b), Raman amplifier 16 can be optimized for wavelengths between 1430 to 1530 nm. Rare-earth doped optical amplifier 18 can be optimized for wavelengths between 1530 to 1620 nm. Rare-earth doped optical amplifier 18 is preferably doped with erbium, thulium, telluride, preseodenium.

Additional elements can be included with any of the amplifiers 10 and 11 of FIG. 1(a) through FIG. 4(b). Such elements include but not limited to gain equalizers, add/drop multiplexers, dispersion compensating elements and the like, all of which can be positioned in and around the amplifier. Suitable gain equalizers include but are not limited to long period gratings, Mach-Zehnder interferometer filters, dielectric filters and the like. Suitable add/drop multiplexers include but are not limited to gratings and circulators, gratings in Mach-Zehnder interferometers and dielectric filters. Suitable dispersion compensating elements include but are not limited chirped gratings and circulators and dispersion compensating fibers. Amplifiers 10 and 11 can be included in multi-stage sub-systems, have more than two amplifiers in parallel configurations and be discrete or distributed amplifiers.

Figure 5A:
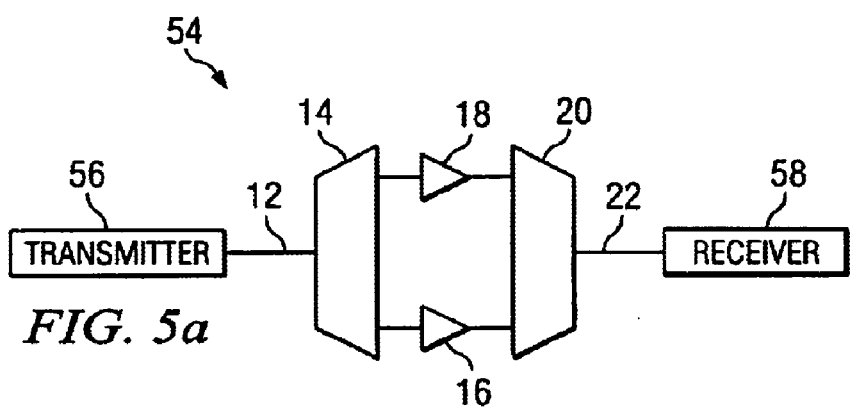
FIGS. 5(a) through 11(b) are schematic diagrams illustrating different embodiments of broadband communication systems of the present invention.
Figure 5B:
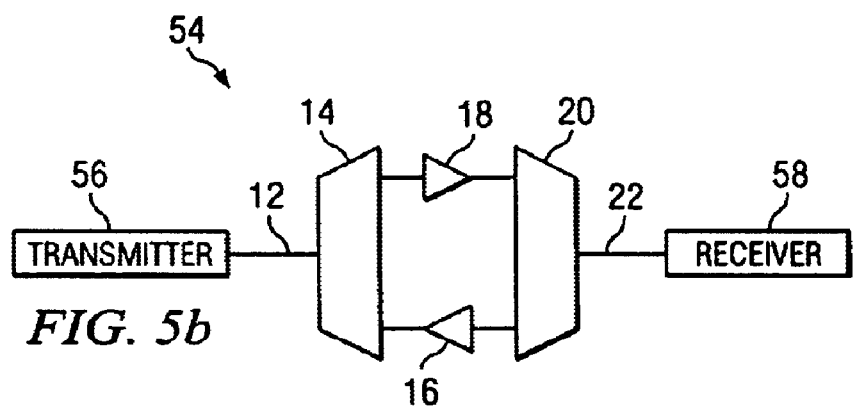

The present invention is also a broadband communication system. Referring now to FIGS. 5(a) and 5(b), amplifiers 10 and 11 can be coupled with any type of transmitter and receiver. As illustrated, broadband communication system 54 includes a transmitter 56 coupled to input fiber 12. A receiver 58 is coupled to output fiber 22 which in turn is coupled to combiner 20. Transmitter 56 can be a semiconductor laser as well as other types of lasers and devices that emit wavelengths. Receiver 58 can be a detector coupled with electronic circuitry. In FIG. 5(a) Raman amplifier 16 and rare-earth doped optical amplifier 18 are arranged so that the first and second bands co-propagate, while in FIG. 5(b) they are arranged so that the first and second bands counter-propagate.

Figure 6A:
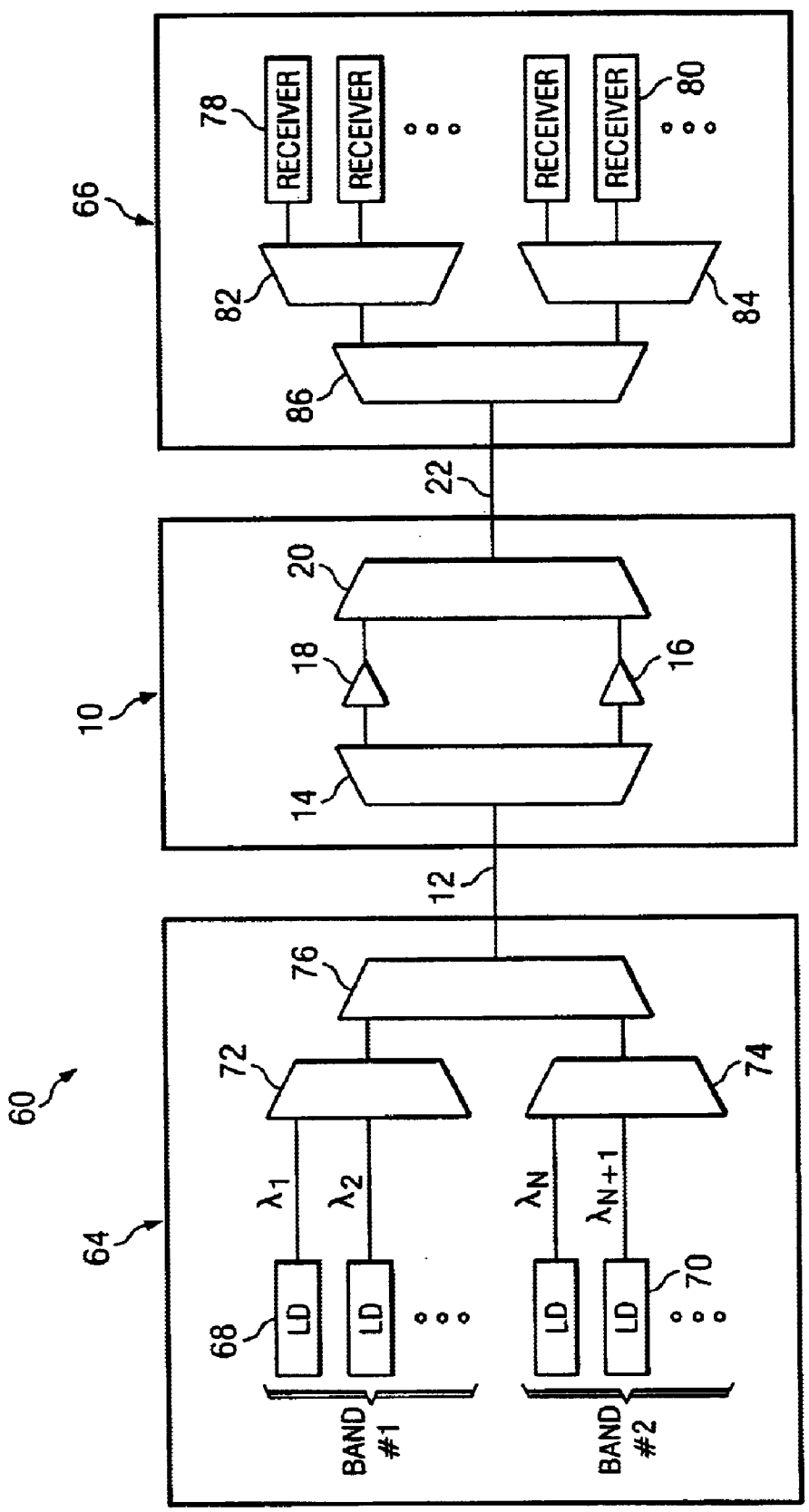
Figure 6B:
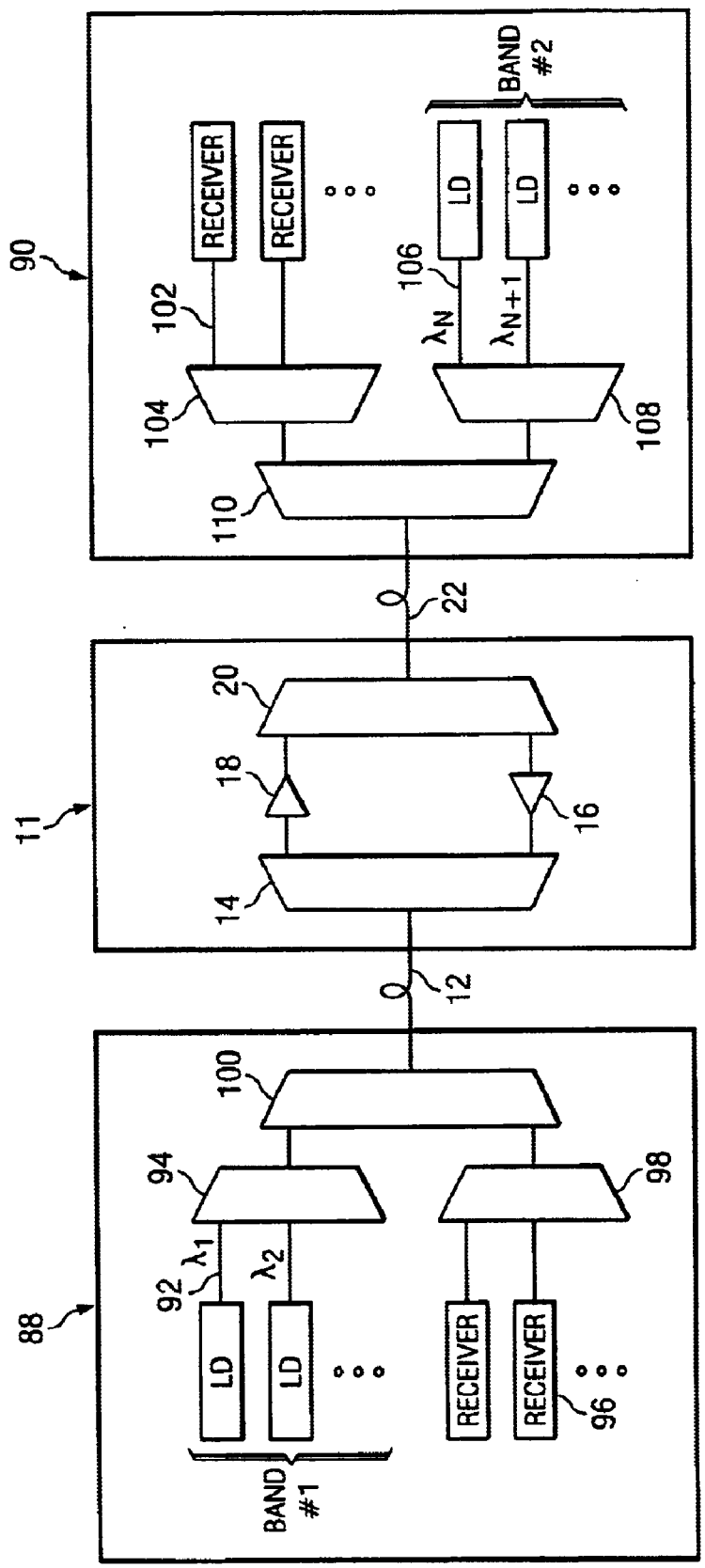

FIGS. 6(a) and 6(b) illustrate other embodiments of broadband communication systems 60 and 62. respectively with in-line amplifiers coupled to transmitter and receiver assemblies. Broadband communication system 60 includes broadband amplifier 10 coupled to a transmitter assembly 64 and a receiver assembly 66. Transmitter assembly 64 includes a first plurality of transmitters 68 that emits a first band of wavelengths, and a second plurality of transmitters 70 that transmit a second band of wavelengths each coupled to a combiner 72 and 74, respectively. The first and second bands co-propagate. Combiners 72 and 74 in turn are coupled to a combiner 76. Combiner 76 is coupled to broadband amplifier 10. Receiver assembly 66 includes a first plurality of receivers 78 and a second plurality of receivers 80, each coupled to a splitter 82 and 84, respectively. Splitters 82 and 84 are coupled to a splitter 86 which is then coupled to broadband amplifier 10.

In FIG. 6(b), amplifier 11 is coupled to a transmitter/receiver assembly 88 and a transmitter receiver assembly 90. Transmitter/receiver assembly 88 includes a first plurality of transmitters 92 coupled to a combiner 94. First plurality of transmitters 92 emits a first band of wavelengths. A first plurality of receivers 96 is coupled to a splitter 98. Combiner 94 and splitter 98 are coupled to a combiner 100 which in turn is coupled to amplifier 11. Transmitter/receiver assembly 90 includes a second plurality of receivers 102 coupled to a splitter 104 and a second plurality of transmitters 106 that transmit a second band of wavelengths. Second plurality of transmitters 106 is coupled to a combiner 108. Splitter 104 and combiner 108 are coupled to a splitter 110 which in turn is coupled to broadband amplifier 11. In the embodiment of FIG. 6(b) the two bands counter-propagate.

Figure 7A:
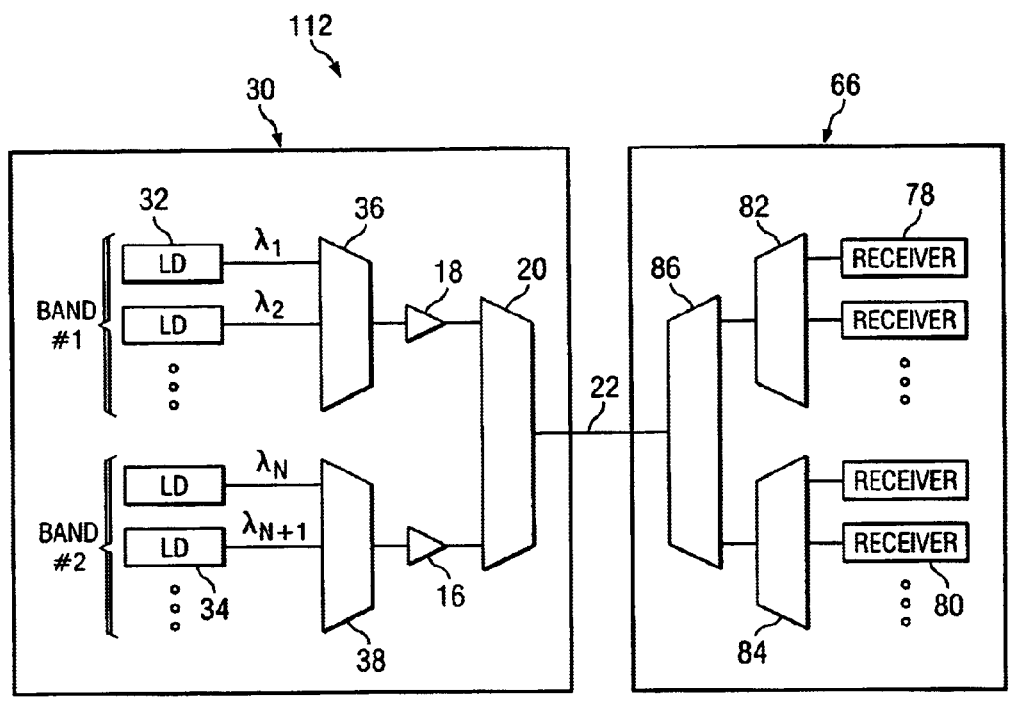
Figure 7B:
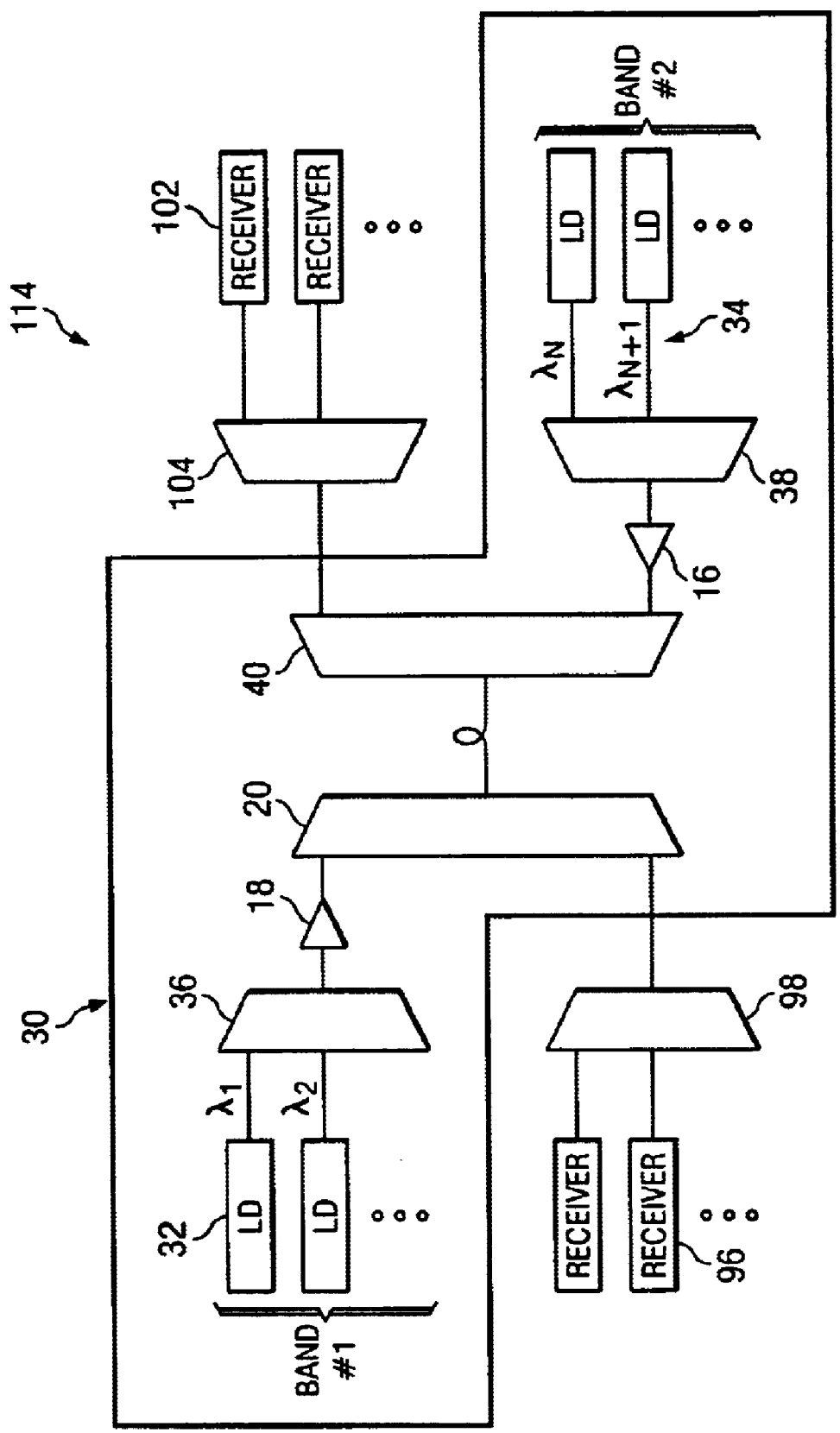

As illustrated in FIGS. 7(a) and 7(b) booster amplifiers are connected to a transmission line and a receiver assembly. A broadband communication system 112, illustrated in FIG. 7(a) includes broadband booster amplifier 30 coupled to receiver assembly 66. In this embodiment, the first and second bands co-propagate.

Broadband communication system 114, illustrated in FIG. 7(b) includes broadband booster amplifier 30 coupled to splitter 98 and splitter 104. First plurality of receivers 96 is coupled to splitter 98. Second plurality of receivers 102 is coupled to splitter 104. Splitter 98 is coupled to combiner 20, and splitter 104 is coupled to combiner 40. The two bands of broadband communication system 114 counter-propagate.

Figure 8A:
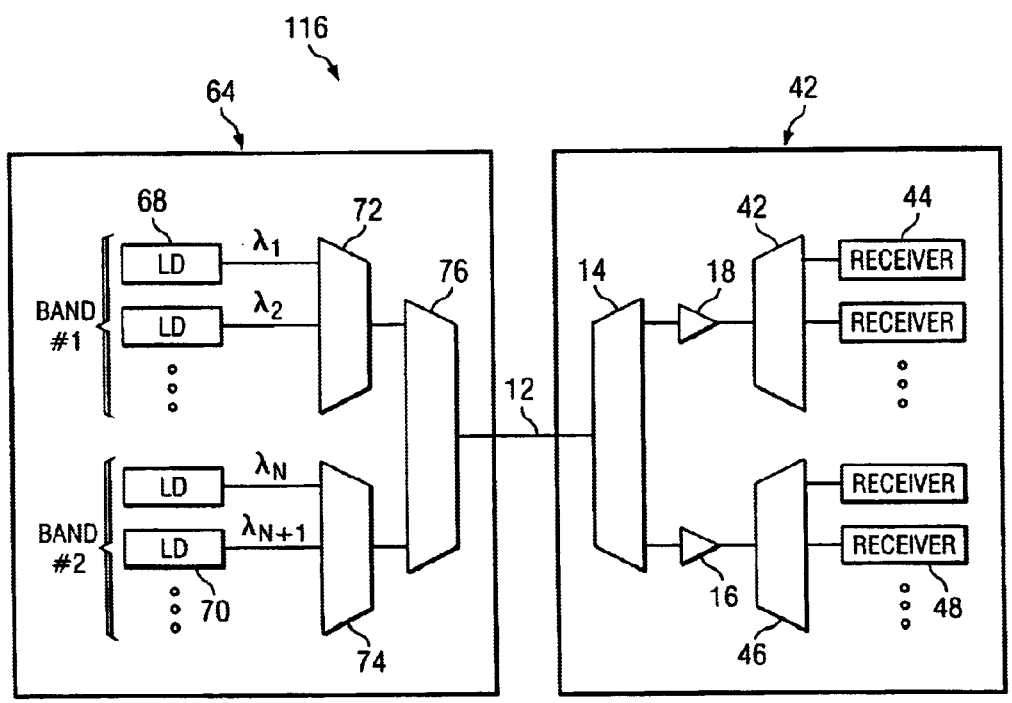
Figure 8B:
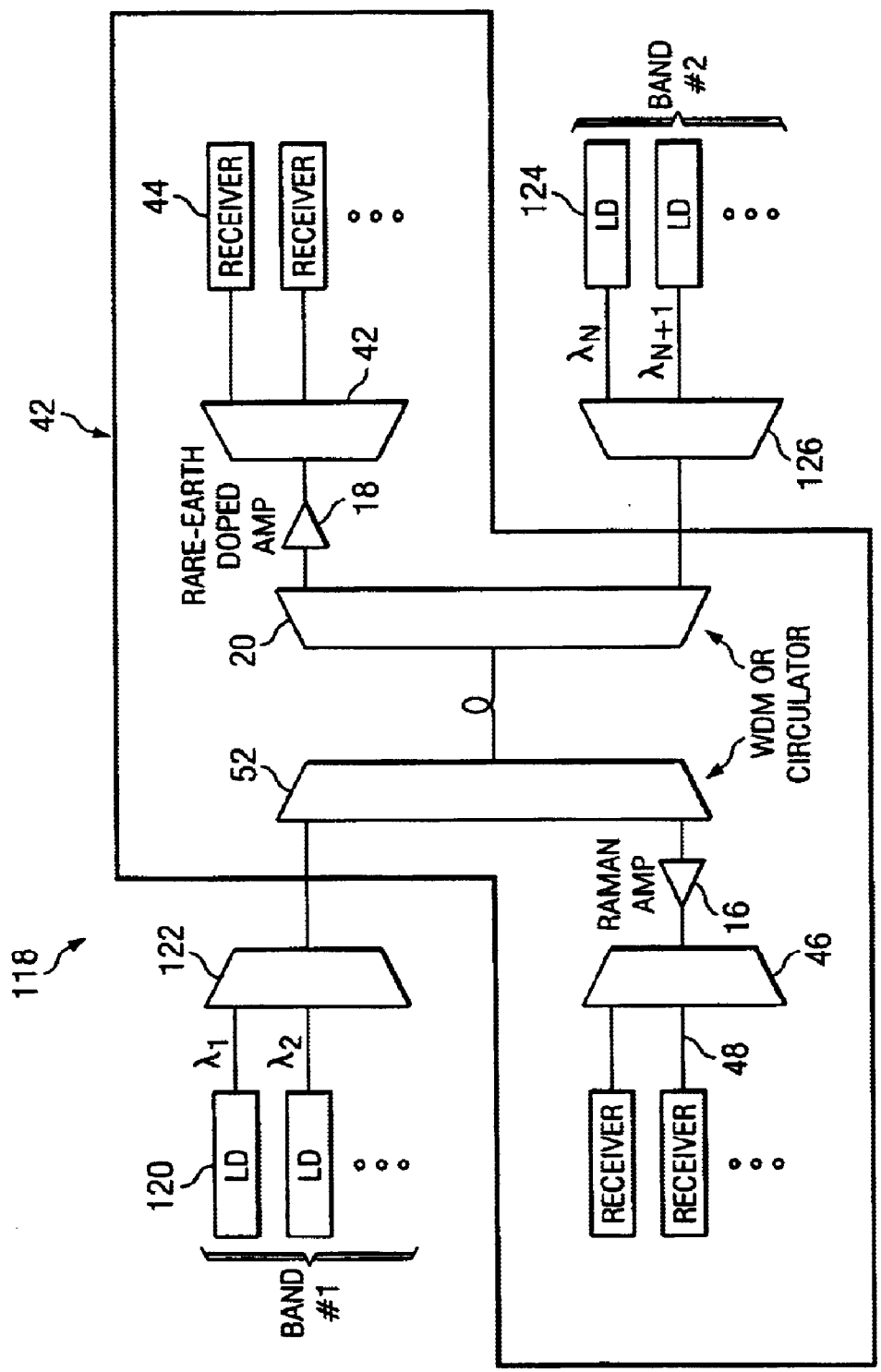

FIGS. 8(a) and 8(b) illustrate pre-amplifiers connected to a transmission line and a transmitter assembly. Broadband communication system 116, illustrated in FIG. 8(a) includes transmitter assembly 64 which is coupled to broadband pre-amplifier 42. The first and second band co-propagate.

Broadband communication system 118, illustrated in FIG. 8(b) includes first plurality of transmitters 120 which transmit a first band of wavelengths. First plurality of transmitters 120 is coupled to a combiner 122. A second plurality of transmitters 124 transmit a second band of wavelengths. Second plurality of transmitters 124 is coupled to combiner 126. Combiner 122 and combiner 126 are each coupled to broadband pre-amplifier 42. The two bands counter-propagate with broadband communication system 118.

Figure 9A:
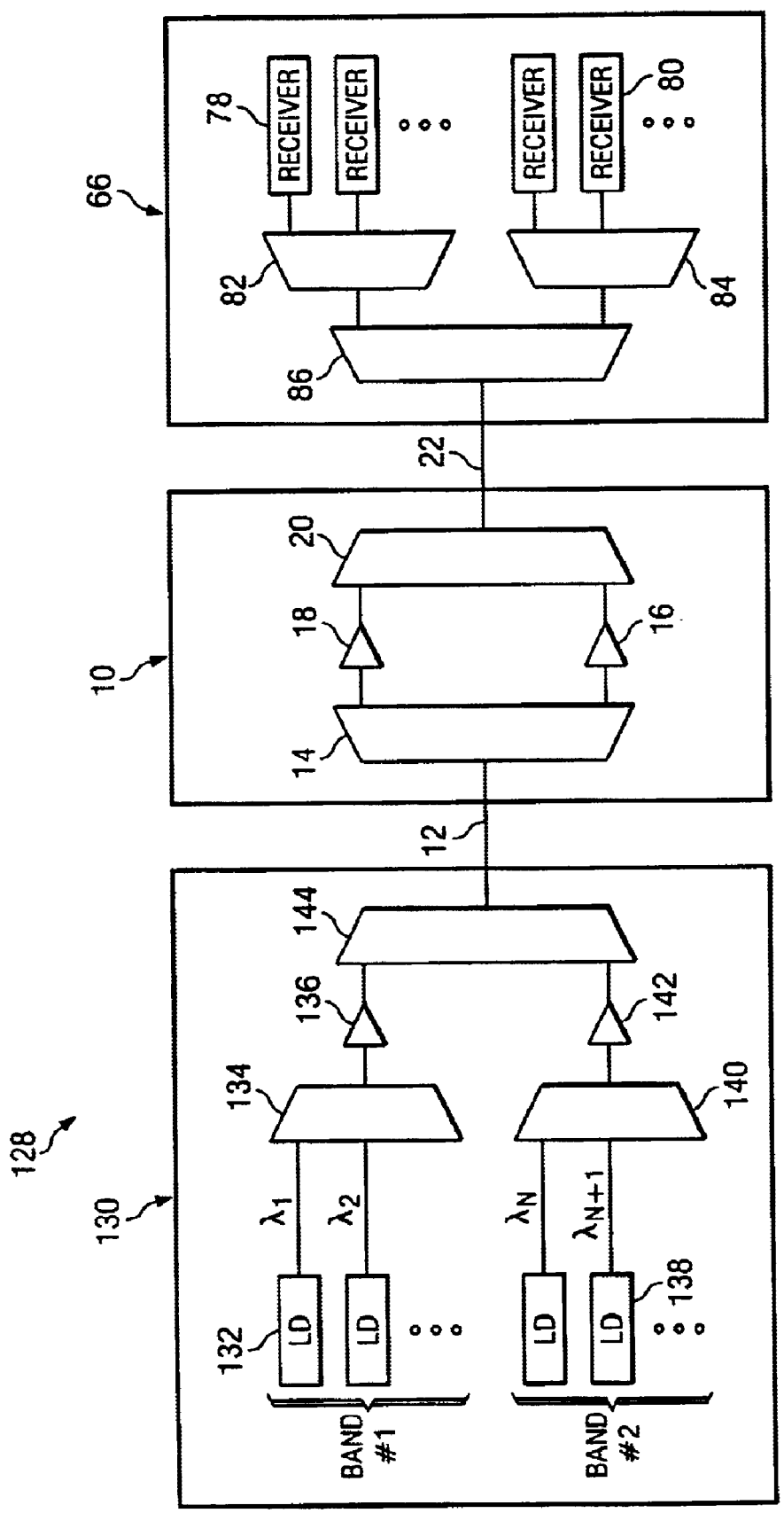
Figure 9B:
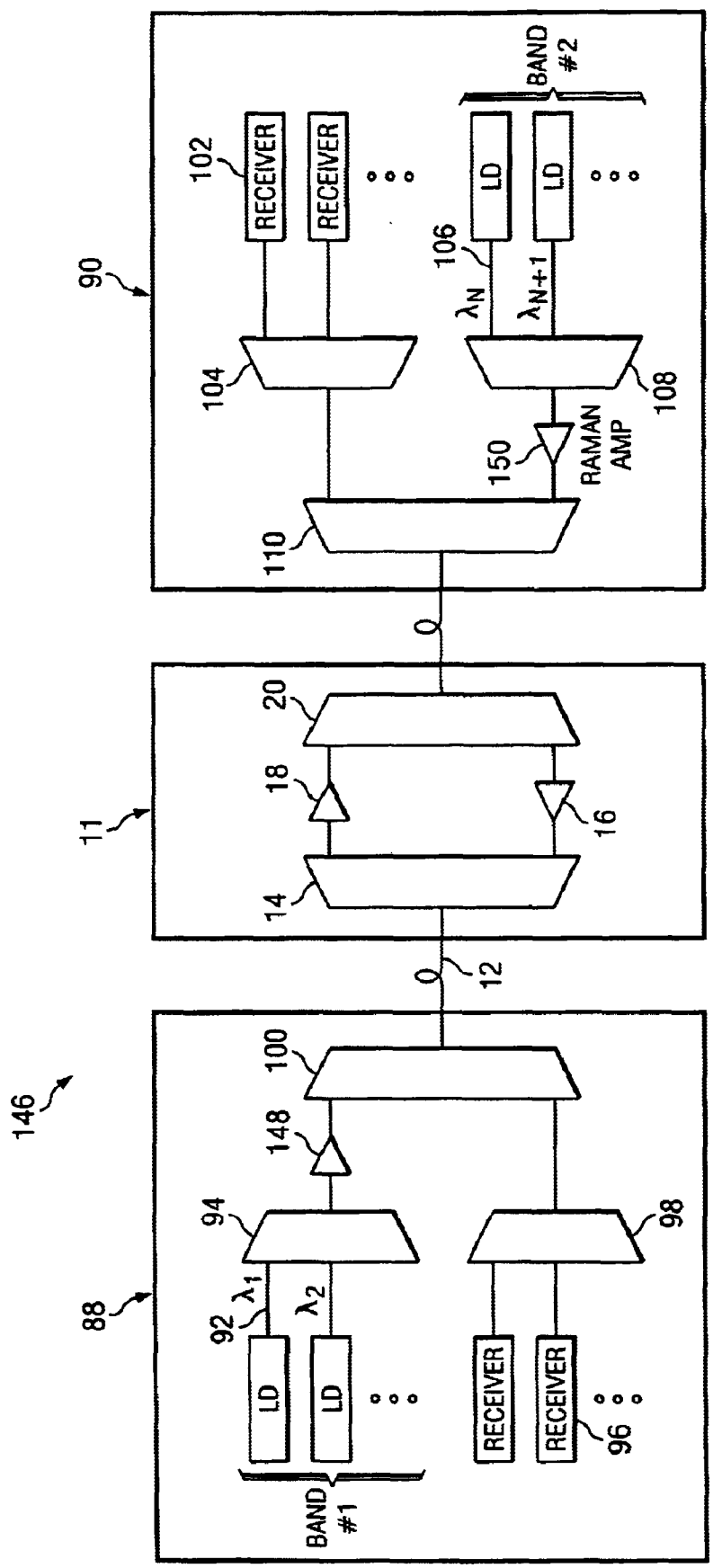

Referring to FIGS. 9(a) and 9(b) a booster amplifier and an in-line amplifier are connected to a transmission line and a receiver assembly.

Broadband communication system 128, illustrated in FIG. 9(a), includes a booster/amplifier assembly 130 and receiver assembly 66, each coupled to amplifier 10. Booster/amplifier assembly 130 includes a first plurality of transmitters 132, a combiner 134, a rare-earth doped amplifier 136, a second plurality of transmitters 138, a combiner 140, a Raman amplifier 142 and a combiner 144. First plurality of transmitters 132 emits a first band of wavelengths, and second plurality of transmitters 138 emits a second band of wavelengths. The first and second band of wavelengths co-propagate. Combiner 144 and splitter 86 are each coupled to amplifier 10.

Broadband communication system 146, illustrated in FIG. 9(b), includes a rare-earth doped amplifier 148 coupled to transmitter/receiver assembly 88. Also included is a Raman amplifier 150 coupled to transmitter/receiver assembly 90. Combiner 100 and splitter 110 are each coupled to amplifier 11. The first and second bands counter-propagate with broadband communication system 146.

Figure 10A:
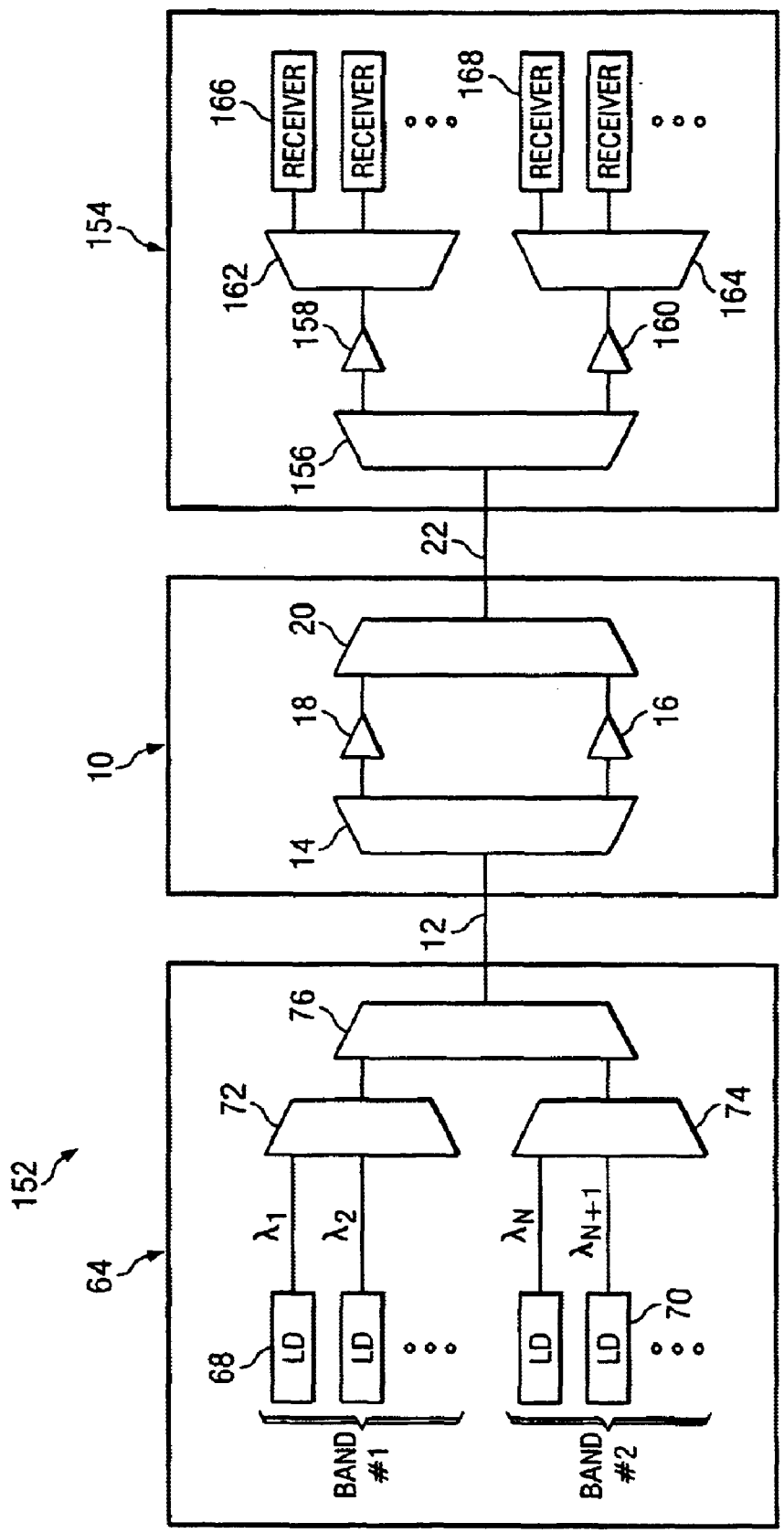
Figure 10B:
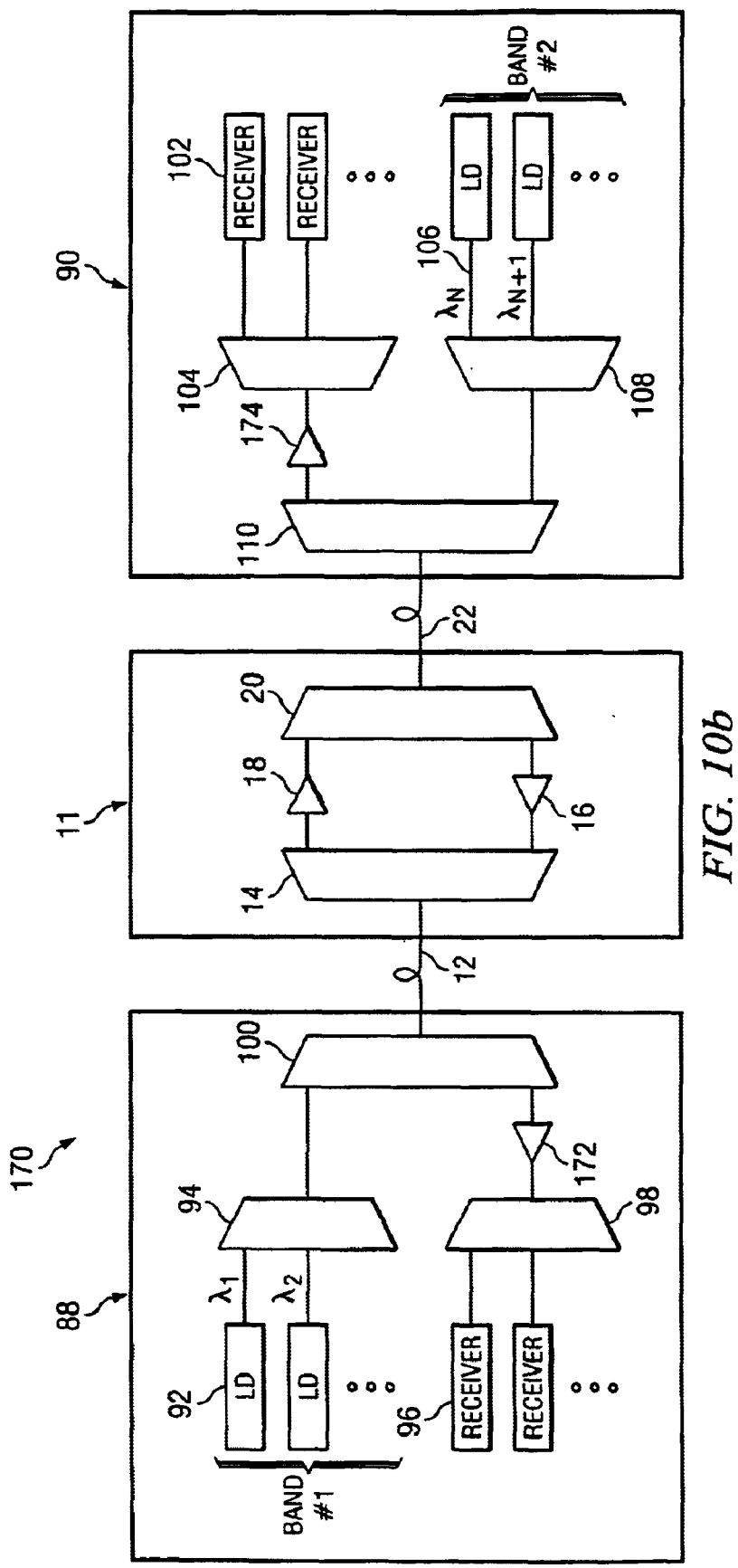

Referring now to FIGS. 10(a) and 10(b), pre-amplifiers and in-line amplifiers are connected to transmission lines and transmitter assemblies. In FIG. 10(a) a broadband communication system 152 includes transmitter assembly 64 and a receiver assembly 154 that are both coupled to amplifier 10. Receiver assembly 154 includes a splitter 156, a rare-earth doped amplifier 158, a Raman amplifier 160, splitters 162 and 164 as well as first and second pluralities of receivers 166 and 168. Rare-earth doped amplifier 158 is coupled to splitters 156 and 162. Raman amplifier 160 is coupled to splitters 156 and 164. The first and second bands co-propagate.

Broadband communication system 170, illustrated in FIG. 10(b), includes a Raman amplifier 172 coupled to transmitter/receiver assembly 88. Raman amplifier 172 is coupled to splitter 98 and combiner 100. A rare earth doped optical amplifier 174 is coupled to transmitter/receiver assembly 90. Rare-earth doped optical amplifier 174 is coupled to splitters 104 and 110. Splitter 10 and combiner 100 are each coupled to amplifier 11. The first and second bands counter-propagate.

Figure 11A:
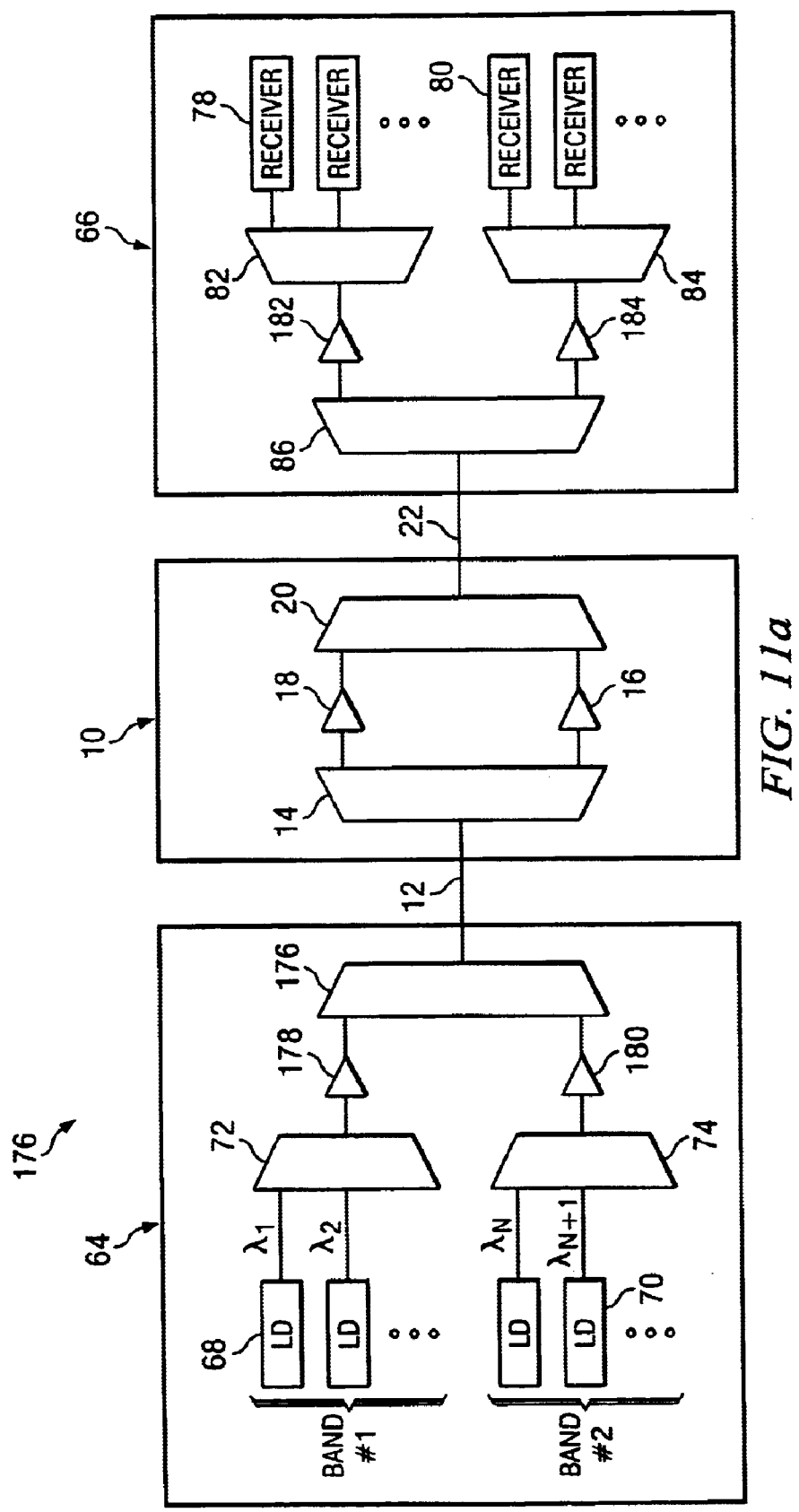
Figure 11B:
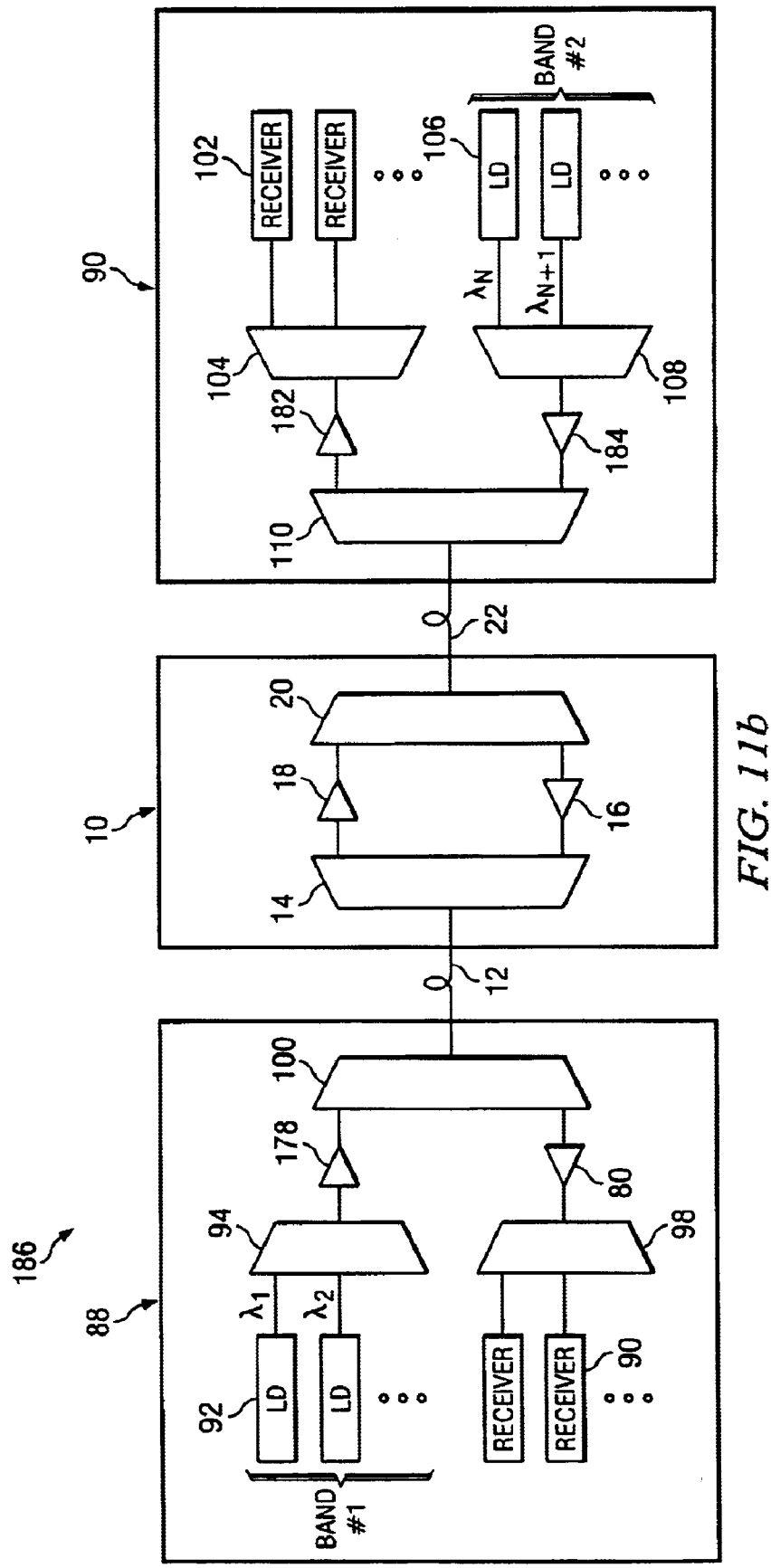

In FIGS. 11(a) and 11(b), a booster amplifier, in-line amplifier and preamplifier are connected to a transmission line. Broadband communication system 176, illustrated in FIG. 11(a), includes a rare-earth doped amplifier 178 and a Raman amplifier 180 that are coupled to transmitter assembly 64. Rare-earth doped amplifier 178 is coupled to combiners 72 and 76. Raman amplifier 180 is coupled to combiners 74 and 76. Combiner 76 is coupled to splitter 14 of amplifier 10. Receiver assembly 154 is coupled to combiner 20 of amplifier 10. A rare-earth doped amplifier 182 and a Raman amplifier 184 are coupled to receiver assembly 66. Rare-earth doped optical amplifier 182 is coupled to splitters 86 and 82. Raman amplifier 184 is coupled to splitters 84 and 86. Splitter 86 and combiner 76 are coupled to amplifier 10. The first and second bands co-propagate.

Referring now to FIG. 11(b), a broadband communication system 186 includes a rare-earth doped optical amplifier 178 and Raman amplifier 180 coupled to transmitter/receiver assembly 88. Rare-earth doped optical amplifier 178 is coupled to combiners 94 and 100. Raman amplifier 180 is coupled to splitter 98 and combiner 100. Rare-earth doped amplifier 182 and Raman amplifier 184 are coupled to transmitter/receiver assembly 90. Rare-earth doped optical amplifier is coupled to splitters 104 and 110. Raman amplifier 184 is coupled to combiner 108 and splitter 110. Splitter 110 and combiner 100 are coupled to amplifier 11. The first and second bands counter-propagate.

The broadband communication systems illustrated in FIGS. 5(a) through 11(b) can employ a variety of different optical fibers including but not limited to standard fiber. DSF, non-zero dispersion shifted fiber (NZ-DSF), and the like. Standard fiber has a zero dispersion wavelength near 1310 nm. The zero dispersion wavelength of DSF is near 1550 nm. NZ-DSF has different zero dispersion wavelengths, depending on the manufacturer. The broadband communication systems of the present invention can designed to be dispersion managed systems with fibers that have different amounts of dispersion spliced together to make a system that has locally high dispersion and globally low dispersion. Further, the broadband communication systems of the present invention have utility in undersea cable systems, wide area networks (WAN), metropolitan area networks (MAN) and local area networks (LAN). Switches, cross-connects, routers, restoration switches and add/drop multiplexers can be included with any of the broadband communication systems of the present invention.

The present invention is also a method of broadband amplification that uses any of the FIG. 1(a) through FIG. 11(b) amplifiers or systems. In this embodiment, an optical signal of wavelength of 1430 nm to 1620 nm is divided at a preselected wavelength into a first beam and a second beam. The first beam is directed to at least one optical amplifier and produces an amplified first beam. The second beam is directed to at least one rare earth doped fiber amplifier to produce an amplified second beam. The first and second amplified beams are combined.

In another embodiment of the present invention, a method of transmitting WDM wavelengths, in any of the FIG. 5(a) through FIG. 11(b) broadband communication systems, includes propagating a plurality of WDM wavelengths from a transmitter assembly along a transmission line. At least a portion of the WDM wavelengths are in the wavelength range of 1430 to 1530 nm. At least a portion of the plurality of wavelengths are amplified with a Raman amplifier assembly to create a plurality of amplified WDM wavelengths. The plurality of amplified WDM wavelengths are received at a receiver assembly. At least a portion of the WDM wavelengths can be in the wavelength range of 1530 to 1570 nm, 1570 to 1630 nm or both.

In another embodiment of the present invention, a method of transmitting WDM wavelengths, in any of the FIG. 5(a) through FIG. 11(b) broadband communication systems, propagates a first plurality of WDM wavelengths in the wavelength range of 1530 to 1620 from a transmitter assembly along a transmission line. A second plurality of WDM wavelengths in the wavelength range of 1430 to 1530 is introduced to the transmission line. The second plurality of WDM wavelengths are amplified by Raman amplification after the second plurality of WDM wavelengths are introduced to the transmission line. The first and second pluralities of WDM wavelengths are received at a receiver assembly.

In another embodiment of the present invention, a method of transmitting WDM wavelengths, in any of the FIG. 5(a) through FIG. 11(b) broadband communication systems, propagates a plurality of WDM wavelengths from a transmitter assembly along a transmission line. At least a portion of the plurality of WDM wavelengths are in the wavelength range of 1430 to 1530 nm. A portion of the plurality of wavelengths are amplified with a Raman amplifier assembly to create a plurality of amplified WDM wavelengths that are received at a receiver assembly.

In another embodiment of the present invention, a method of transmitting WDM wavelengths, in any of the FIG. 5(a) through FIG. 11(b) broadband communication systems, propagates a first plurality of WDM wavelengths in the wavelength range of 1530 to 1620 from a transmitter assembly along a transmission line. A second plurality of WDM wavelengths in the wavelength range of 1430 to 1530 are introduced to the transmission line. The second plurality of WDM wavelengths are amplified by Raman amplification after the second plurality of WDM wavelengths are introduced to the transmission line. The first and second pluralities of WDM wavelengths are received at a receiver assembly. The transmission line can be coupled to a Raman amplifier assembly that Raman amplifies the second plurality of WDM wavelengths.

In the methods of the present invention, the transmission can have a magnitude of dispersion of at least 5 ps/(nm)(km), be in the range of 1–5 ps/(nm)(km) or be less than 1 ps/(nm)(km). Raman amplifier assemblies of the methods of the present invention can include a discrete Raman amplifier inserted into the transmission line. The Raman amplifier assembly can include a distributed Raman amplifier and a discrete Raman amplifier. Additionally, the Raman amplifier assembly can include a dispersion compensating fiber with a magnitude of dispersion of at least 50 ps/(nm)(km). At least a portion of the gain of the Raman amplifier assembly can be in the dispersion compensating fiber.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An in-line broadband amplifier, comprising:
   at least one input fiber
   a WDM splitter coupled to the input fiber, the splitter splitting an optical signal into at least a first wavelength and a second wavelength, wherein a transition from a stop band to a pass band of the splitter occurs in 20 nm or less;
   a Raman amplifier coupled to the splitter;
   a rare-earth doped optical amplifier coupled to the splitter;
   a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less; and
   an output fiber coupled to the WDM combiner.

2. The amplifier of claim 1, wherein the transition from the stop band to the pass band of the splitter occurs in 15 nm or less.

3. The amplifier of claim 2, wherein the transition from the stop band to the pass band of the combiner occurs in 15 nm or less.

4. The amplifier of claim 1, wherein the input fiber transmits at least a first wavelength and a second wavelength.

5. The amplifier of claim 4, wherein the first wavelength falls within a gain bandwidth of the Raman amplifier and the second wavelength falls within a gain bandwidth of the rare-earth doped optical amplifier.

6. The amplifier of claim 1, further comprising:
   a gain tilt control device coupled to at least one of the splitter, Raman amplifier, rare-earth doped optical amplifier or combiner.

7. A broadband communication system, comprising:
   a transmitter;
   at least one input fiber coupled to the transmitter
   a WDM splitter coupled to the input fiber, the splitter splitting an optical signal into at least a first wavelength and a second wavelength, wherein a transition from a stop band to a pass band of the splitter occurs in 20 nm or less;
   a Raman amplifier coupled to the splitter;
   a rare-earth doped optical amplifier coupled to the splitter;
   a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less;
   an output fiber coupled to the WDM combiner; and
   a receiver coupled to the output fiber.

8. The system of claim 7 wherein the transition from the stop band to the pass band of the splitter occurs in 15 nm or less.

9. The system of claim 7 wherein the transition from the stop band to the pass band of the combiner occurs in 10 nm or less.

10. The system of claim 7 wherein the input fiber transmits at least a first wavelength and a second wavelength.

11. The system of claim 10 wherein the first wavelength falls within a gain bandwidth of the Raman amplifier and the second wavelength falls within a gain bandwidth of the rare-earth doped optical amplifier.

12. The system of claim 7 further comprising:
   a gain tilt control device coupled to at least one of the splitter, Raman amplifier, rare-earth doped optical amplifier or combiner.

13. A broadband booster amplifier, comprising:
   a plurality of transmitters transmitting a plurality of wavelengths including at least a first band of wavelengths and a second band of wavelengths;
   a Raman amplifier coupled to at least a portion of the plurality of transmitters and amplifies the first band of wavelengths;
   a rare-earth doped optical amplifier coupled to at least a portion of the plurality of transmitters and amplifies the second band of wavelengths;
   a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less; and an output fiber coupled to the WDM combiner.

14. The amplifier of claim 13, wherein the transition from the stop band to the pass band of the combiner occurs in 15 nm or less.

15. The amplifier of claim 13, further comprising:

a gain tilt control device coupled to at least one of the Raman amplifier, rare-earth doped optical amplifier or combiner.

16. A broadband communication system, comprising:

a transmitter;

at least one input fiber coupled to the transmitter a WDM splitter coupled to the input fiber, the splitter splitting an optical signal into at least a first wavelength and a second wavelength, wherein a transition from a stop band to a pass band of the splitter occurs in 20 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less;

an output fiber coupled to the WDM combiner;

at least one in-line broadband amplifier coupled to the output fiber;

a receiver coupled to the in-line amplifier.

17. The system of claim 16, wherein the in-line amplifier comprises:

at least one input fiber a WDM splitter coupled to the input fiber, the splitter splitting an optical signal into at least a first wavelength and a second wavelength, wherein a transition from a stop band to a pass band of the splitter occurs in 20 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less; and an output fiber coupled to the WDM combiner.

18. A broadband pre-amplifier, comprising:

at least one input fiber a WDM splitter coupled to the input fiber, the splitter splitting an optical signal into at least a first wavelength and a second wavelength, wherein a transition from a stop band to a pass band of the splitter occurs in 20 nm or less;

a Raman amplifier coupled to the splitter;

a rare-earth doped optical amplifier coupled to the splitter;

a plurality of receivers, wherein at least a first portion of the plurality of receivers is coupled to the Raman amplifier and at least a second portion of the receivers is coupled to the rare-earth doped optical amplifier.

19. A broadband communication system, comprising: a transmitter; at least one input fiber coupled to the transmitter;

a WDM splitter coupled to the input fiber, the splitter splitting an optical signal into at least a first beam and a second beam, wherein a transition from a stop band to a pass band of the coupler occurs in 15 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first beam and a second beam, wherein a transition from a stop band to a pass band of the coupler occurs in 15 nm or less; and an output fiber coupled to the WDM combiner a receiver coupled to the output fiber.

20. A broadband communication system, comprising:

a broadband booster amplifier;

at least one input fiber coupled to the broadband booster amplifier;

a WDM splitter coupled to the input fiber, the splitter splitting an optical signal into at least a first beam and a second beam, wherein a transition from a stop band to a pass band of the coupler occurs in 15 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first beam and a second beam, wherein a transition from a stop band to a pass band of the coupler occurs in 15 nm or less; and an output fiber coupled to the WDM combiner a receiver coupled to the output fiber.

21. The system of claim 20, wherein the broadband booster amplifier comprises:

a plurality of transmitters transmitting a plurality of wavelengths including at least a first band of wavelengths and a second band of wavelengths;

a Raman amplifier coupled to at least a portion of the plurality of transmitters and amplifies the first band of wavelengths;

a rare-earth doped optical amplifier coupled to at least a portion of the plurality of transmitters and amplifies the second band of wavelengths;

a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less; and an output fiber coupled to the WDM combiner.

22. A broadband communication system, comprising: a transmitter; at least one input fiber coupled to the transmitter;

a WDM splitter coupled to the input fiber, the splitter splitting an optical signal into at least a first beam and a second beam, wherein a transition from a stop band to a pass band of the coupler occurs in 15 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first beam and a second beam, wherein a transition from a stop band to a pass band of the coupler occurs in 15 nm or less; and an output fiber coupled to the WDM combiner a broadband pre-amplifier coupled to the output fiber.

23. The system of claim 22, wherein the broadband pre-amplifier comprises:

at least one input fiber a WDM splitter coupled to the input fiber, the splitter splitting an optical signal into at least a first wavelength and a second wavelength, wherein a transition from a stop band to a pass band of the splitter occurs in 20 nm or less;

a Raman amplifier coupled to the splitter;

a rare-earth doped optical amplifier coupled to the splitter;

a plurality of receivers, wherein at least a first portion of the plurality of receivers is coupled to the Raman amplifier and at least a second portion of the receivers is coupled to the rare-earth doped optical amplifier.

24. A broadband communication system, comprising:

a transmitter;

a booster broadband amplifier coupled to the transmitter;

at least one input fiber coupled to booster amplifier;

a WDM splitter coupled to the input fiber, the splitter splitting an optical signal into at least a first beam and a second beam, wherein a transition from a stop band to a pass band of the coupler occurs in 15 nm or less;

a Raman amplifier coupled to the splitter;

a rare-earth doped optical amplifier coupled to the splitter;

a WDM combiner coupled to the Raman amplifier and the rare-earth doped optical amplifier, the WDM combiner combining an optical signal into at least a first beam and a second beam, wherein a transition from a stop band to a pass band of the coupler occurs in 15 nm or less; and an output fiber coupled to the WDM combiner;

a broadband pre-amplifier coupled to the output fiber; and a receiver coupled to the broadband pre-amplifier.

25. The system of claim 24, wherein the booster broadband amplifier comprises:

a plurality of transmitters transmitting a plurality of wavelengths including at least a first band of wavelengths and a second band of wavelengths;

a Raman amplifier coupled to at least a portion of the plurality of transmitters and amplifies the first band of wavelengths;

a rare-earth doped optical amplifier coupled to at least a portion of the plurality of transmitters and amplifies the second band of wavelengths;

a WDM combiner coupled to the Raman amplifier and the rare-earth doped optical amplifier, the WDM combiner combining an optical signal into at least a first wavelength and a second wavelength, wherein a transition from a stop band to a pass band of the combiner occurs in 20 nm or less; and an output fiber coupled to the WDM combiner.

26. The system of claim 25, wherein the broadband pre-amplifier comprises:

at least one input fiber a WDM splitter coupled to the input fiber, the splitter splitting an optical signal into at least a first wavelength and a second wavelength, wherein a transition from a stop band to a pass band of the splitter occurs in 20 nm or less;

a Raman amplifier coupled to the splitter;

a rare-earth doped optical amplifier coupled to the splitter;

a plurality of receivers wherein at least a first portion of the plurality of receivers is coupled to the Raman amplifier and at least a second portion of the receivers is coupled to the rare-earth doped optical amplifier.

* * * * *